(12) United States Patent
Fong et al.

(10) Patent No.: US 11,886,678 B2
(45) Date of Patent: *Jan. 30, 2024

(54) MULTIPLE WINDOWS FOR A GROUP-BASED COMMUNICATION SYSTEM

(71) Applicant: Salesforce, Inc., San Francisco, CA (US)

(72) Inventors: Andrew Fong, Menlo Park, CA (US); Felix Rieseberg, San Francisco, CA (US); Andrew Locascio, San Francisco, CA (US); Samuel Attard, Vancouver (CA); Alfred Xing, Vancouver (CA); Albert Xing, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,287

(22) Filed: Sep. 27, 2022

(65) Prior Publication Data

US 2023/0029144 A1    Jan. 26, 2023

Related U.S. Application Data

(63) Continuation of application No. 17/217,283, filed on Mar. 30, 2021, now Pat. No. 11,487,397.

(51) Int. Cl.
  *G06F 3/0481*   (2022.01)
  *G06F 3/0484*   (2022.01)
  *H04L 51/04*   (2022.01)

(52) U.S. Cl.
  CPC .......... *G06F 3/0481* (2013.01); *G06F 3/0484* (2013.01); *H04L 51/04* (2013.01)

(58) Field of Classification Search
  None
  See application file for complete search history.

(56) References Cited

U.S. PATENT DOCUMENTS

| | | | | |
|---|---|---|---|---|
| 5,808,610 A | * | 9/1998 | Benson ................. | G06F 3/0481 715/788 |
| 5,917,483 A | * | 6/1999 | Duncan ................. | G06F 3/0481 715/788 |

(Continued)

OTHER PUBLICATIONS

"Die, Email, Die! A Flickr Cofounder Aims To Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Ryan Barrett
(74) *Attorney, Agent, or Firm* — Lee & Hayes, P.C.

(57) ABSTRACT

A system, method, and computer-readable media for dividing the content of a user interface for a group-based communication system among a plurality of windows. A parent window may comprise a plurality of panes. A child window may be created from the parent window by an actuation on a pane of the plurality of panes presented by the user interface. Child windows and the parent window may share computer memory. A plurality of windows may be created to divide the content of the user interface. Libraries designed for single window applications may be modified to work with a plurality of windows. The group-based communication system may be implemented via various web technologies.

20 Claims, 7 Drawing Sheets

(56) References Cited

U.S. PATENT DOCUMENTS

| | | | | |
|---|---|---|---|---|
| 5,920,315 | A * | 7/1999 | Santos-Gomez | G06F 3/0481 715/792 |
| 7,188,317 | B1 * | 3/2007 | Hazel | G06F 3/0481 715/804 |
| 11,487,397 | B2 * | 11/2022 | Fong | G06F 3/0484 |
| 2002/0130904 | A1 * | 9/2002 | Becker | G06F 3/0481 715/753 |
| 2004/0064802 | A1 * | 4/2004 | Cherdron | G06F 8/38 717/100 |
| 2004/0237049 | A1 * | 11/2004 | Pletcher | G06F 9/451 715/760 |
| 2005/0273759 | A1 * | 12/2005 | Lucassen | G06F 8/38 717/113 |
| 2005/0289478 | A1 * | 12/2005 | Landman | G06F 3/0481 715/769 |
| 2006/0064673 | A1 * | 3/2006 | Rogers | G06F 9/451 715/764 |
| 2007/0044035 | A1 * | 2/2007 | Amadio | G06F 3/0481 715/781 |
| 2010/0077340 | A1 * | 3/2010 | French | G06F 3/0481 715/781 |
| 2011/0087984 | A1 * | 4/2011 | Jitkoff | G06F 40/106 715/769 |
| 2011/0145751 | A1 * | 6/2011 | Landman | G06F 3/04847 715/781 |
| 2012/0042261 | A1 * | 2/2012 | Phillips | G06F 9/542 715/744 |
| 2017/0329506 | A1 * | 11/2017 | Laetham | G06F 8/31 |
| 2018/0267684 | A1 * | 9/2018 | Rommel | G06F 3/0482 |
| 2018/0287982 | A1 | 10/2018 | Draeger et al. | |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516> (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

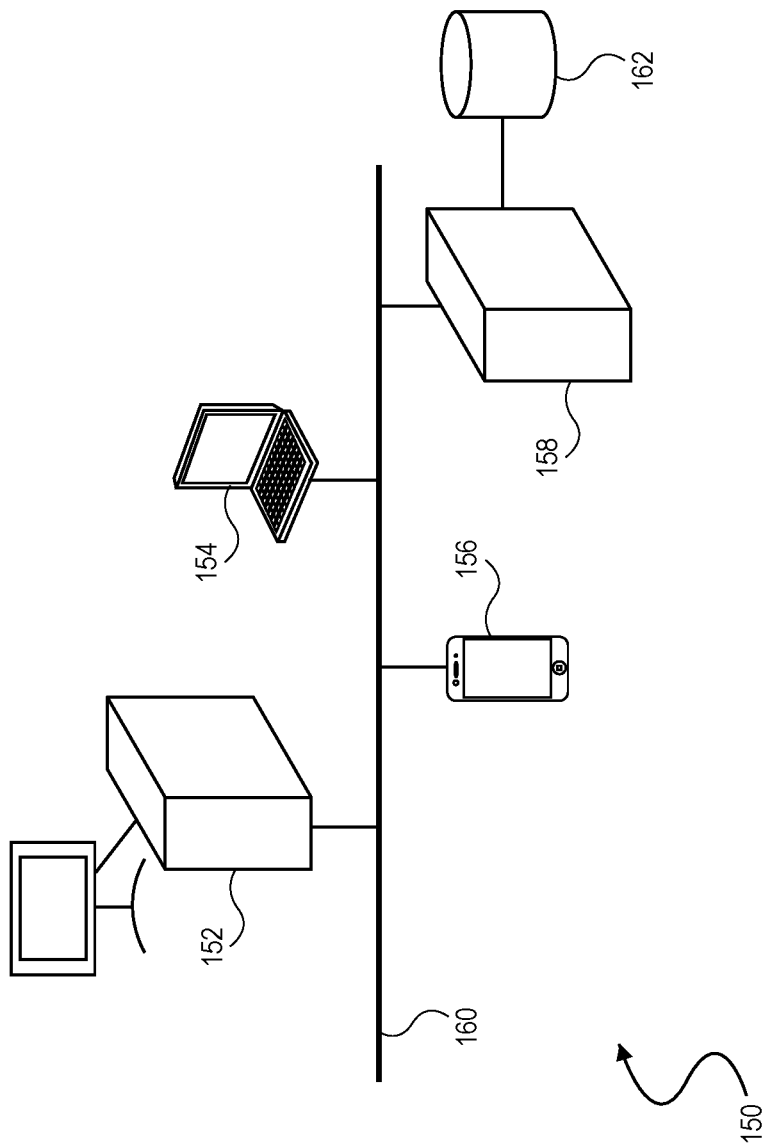

MULTIPLE WINDOWS FOR A GROUP-BASED COMMUNICATION SYSTEM

CROSS-REFERENCE TO RELATED APPLICATIONS

This application is a continuation application claiming priority benefit, with regard to all common subject matter, of U.S. patent application Ser. No. 17/217,283, filed Mar. 30, 2021, and entitled "MULTIPLE WINDOWS FOR A GROUP-BASED COMMUNICATION SYSTEM," which is hereby incorporated by reference in its entirety.

TECHNICAL FIELD

Embodiments of the invention relate to creating multiple windows in a user interface. More specifically, embodiments of the invention relate to creating multiple child windows from a parent window making up the user interface for a group-based communication system.

Typically, desktop GUI applications developed using web technologies (such as, for example, Electron) typically only allow for a single window at a time for a given instance of the application, and application programming interfaces therefore implicitly assumes that all the content of the interface shares a single window. Working in just a single window may prove cumbersome and inefficient for users trying to manage multiple tasks at a time. Further, users may want to view two or more applications simultaneously but may lack the ability to manipulate the applications' windows in a manner to provide effective viewing. However, creating multiple instances of an application to allow for multiple tasks leads to wasted memory and processor resources, and changing the web technology framework may be infeasible.

Accordingly, what is needed is a system that allows for developers of desktop GUI applications developed using web technologies to allow users to divide the content of a user interface by creating child windows to increase user productivity while not needlessly duplicating resource usage and thereby impacting the performance of the application.

SUMMARY

Embodiments of the invention solve the above-mentioned problems by providing a system, method, and computer-readable media for creating multiple windows that is particularly useful when developing applications using web technologies. A first embodiment of the invention is directed to one or more non-transitory computer-readable media storing computer-executable instructions that, when executed by a processor, perform a method of dividing the content of a user interface for a group-based communication system among a plurality of windows, the method comprising: presenting a parent window comprising a plurality of parent panes, the parent window making up the user interface for the group-based communication system, wherein receiving a first type of actuation of a control in a control parent pane of the plurality of parent panes causes a change in a state of a target parent pane of the plurality of parent panes; receiving a second type of actuation of the control in the control parent pane, the second type of actuation being distinct from the first type of actuation; and creating a child window for the user interface for the group-based communication system, the child window being distinct from the parent window and comprising one or more child panes, the one or more child panes corresponding to a subset of the plurality of parent panes, wherein the one or more child panes include a target child pane corresponding to the target parent pane and reflecting the change in the state of the target parent pane, wherein the one or more child panes excludes at least one of the plurality of parent panes.

A second embodiment of the invention is directed to a method of dividing the content of a user interface for a group-based communication system among a plurality of windows, the method comprising: presenting a parent window comprising a plurality of parent panes, the parent window making up the user interface for the group-based communication system, wherein receiving a first type of actuation of a control in a control parent pane of the plurality of parent panes causes a change in a state of a target parent pane of the plurality of parent panes; receiving a second type of actuation of the control in the control parent pane, the second type of actuation being distinct from the first type of actuation; and creating a child window for the user interface for the group-based communication system, the child window being distinct from the parent window and comprising one or more child panes, the one or more child panes corresponding to a subset of the plurality of parent panes, wherein the one or more child panes include a target child pane corresponding to the target parent pane and reflecting the change in the state of the target parent pane, wherein the one or more child panes excludes at least one of the plurality of parent panes.

A third embodiment of the invention is directed to a system for dividing the content of a user interface for a group-based communication system among a plurality of windows, the method comprising presenting a parent window comprising a plurality of parent panes, the parent window making up the user interface for the group-based communication system, wherein receiving a first type of actuation of a control in a control parent pane of the plurality of parent panes causes a change in a state of a target parent pane of the plurality of parent panes, receiving a second type of actuation of the control in the control parent pane, the second type of actuation being distinct from the first type of actuation; and creating a child window for the user interface for the group-based communication system, the child window being distinct from the parent window and comprising one or more child panes, the one or more child panes corresponding to a subset of the plurality of parent panes, wherein the one or more child panes include a target child pane corresponding to the target parent pane and reflecting the change in the state of the target parent pane, wherein the one or more child panes excludes at least one of the plurality of parent panes.

A fourth embodiment of the invention is directed to a system for dividing the content of a user interface for a group-based communication system among a plurality of windows, the method comprising presenting a parent window comprising a plurality of parent panes, the parent window making up the user interface for the group-based communication system, wherein receiving a first type of actuation of a control in a control parent pane of the plurality of parent panes causes a change in a state of a target parent pane of the plurality of parent panes, receiving a second type of actuation of the control in the control parent pane, the second type of actuation being distinct from the first type of actuation; and creating a child window for the user interface for the group-based communication system, the child window being distinct from the parent window and comprising one or more child panes, the one or more child panes corresponding to a subset of the plurality of parent panes, wherein the one or more child panes include a target child pane corresponding to the target parent pane and reflecting the change in the state of the target parent pane, wherein the one or more child panes excludes at least one of the plurality of parent panes, receiving an input in the target child pane causing a change of state in the target child pane, wherein the change of state in the target child pane is reflected in the target parent pane, and wherein the change of state in the target child pane is reflected in at least one other child pane.

A fifth embodiment of the invention is directed to a system for dividing the content of a user interface for a group-based communication system among a plurality of windows, the method comprising presenting a parent window comprising a plurality of parent panes, the parent window making up the user interface for the group-based communication system, wherein receiving a first type of actuation of a control in a control parent pane of the plurality of parent panes causes a change in a state of a target parent pane of the plurality of parent panes, receiving a second type of actuation of the control in the control parent pane, the second type of actuation being distinct from the first type of actuation; and creating a child window for the user interface for the group-based communication system, the child window being distinct from the parent window and comprising one or more child panes, the one or more child panes corresponding to a subset of the plurality of parent panes, wherein the one or more child panes include a target child pane corresponding to the target parent pane and reflecting the change in the state of the target parent pane, wherein the one or more child panes excludes at least one of the plurality of parent panes, receiving an input in the target child pane causing a change of state in the target child pane, wherein the change of state in the target child pane is reflected in the target parent pane, wherein the one or more child panes excludes the control parent pane, wherein the first type of actuation is a left click on a mouse and the second type of actuation is a right click on the mouse and a selection of a menu item, wherein the second type of actuation is a tearing off of the target parent pane from the parent window, causing the target parent pane to be removed from the parent window.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 1B depicts an exemplary diagram illustrating components of a system for carrying out embodiments of the invention;

Figure 1A:
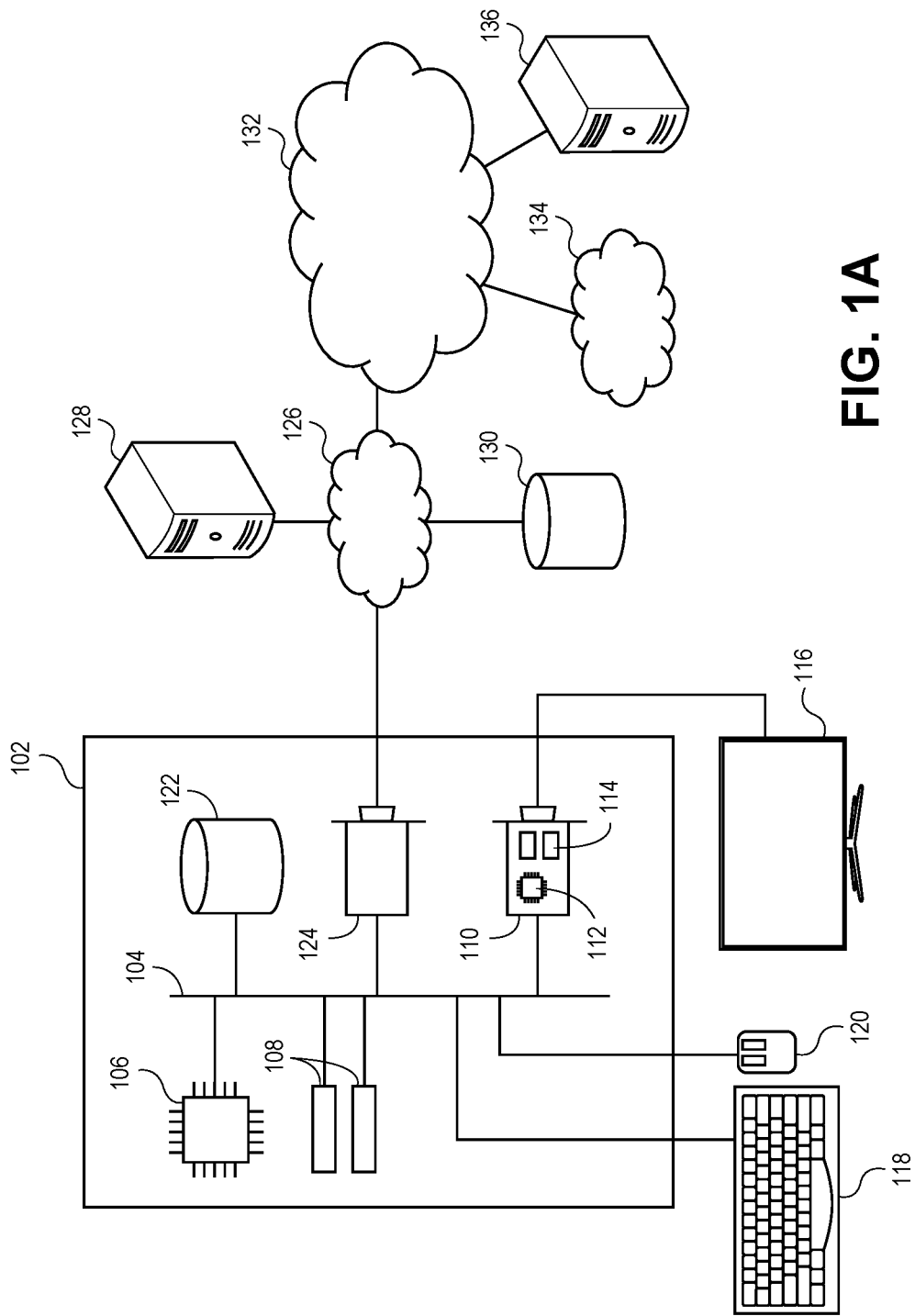
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

As used herein, the term "group-based communication system" refers to a collaborative communication system used within an organization and is distinct from a conventional communication system such as email or group text messaging via SMS or MMS. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system. A group-based communication system object may include any instance of communication data within a group-based communication system. Communication data and other content within a group-based communication system is also referred to generally as group-based communication system content.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

At a high level, embodiments of the invention provide for dividing the content of a user interface (for example, the user interface of a group-based communication system) into multiple windows. In contrast to utilizing a single window to manage communications in group-based communication systems, dividing the main, parent window into one or more child windows allows users to increase productivity by viewing multiple topics concurrently. For example, a user may be a member of a software development team and may be working on programming a new feature, and the user's software development team may utilize the group-based communication system to collaborate with team members. The user may be in communication with another team member to receive assistance while programming the new feature. Typically, in group-based communication systems that utilize a single window, it would be difficult for the user to both monitor the group-based communication system and work on the programming task as the group-based communication system window would take up unnecessary space on the display. While the user may be able to adjust dimensions of the window, extraneous features such as sidebars or search bars, would remain visible in the user interface, taking up valuable space. Therefore, allowing for the content of the group-based communication system to be divided into multiple child windows, wherein the child windows do not contain the same content as the parent window, allows for smaller windows to be created that can more easily be used and overlaid in conjunction with other windows of the applications. These smaller, child windows may be configured such that only the most pertinent content is displayed. The use of multiple windows also allows users to copy and paste content from one part of the group-based communication system to another. In some embodiments, child windows may in turn have sub-child windows, and so on.

Additionally, the child windows may also be overlaid on windows of other applications that are not a part of the group-based communication system. Users may utilize the group-based communication system to communicate with their coworkers but complete the majority of their actual work in applications that are not the group-based communication system. For example, an engineer may work in computer aided design (CAD) applications and may also use the group-based communication system to communicate and collaborate with team members. If the engineer creates a child window while the CAD application is also open, the child window can open over the window displaying the CAD information, and the user can work in the CAD application while also being able to participate in the group-based communication system without the group-based communication application window taking up too much space on the display.

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

It should be understood that, in some embodiments, any of the components described with respect to FIG. 1A may be included in a mobile device. For example, in some embodiments, computer 102 and its contents are displayed within a mobile phone. Similarly, embodiments are contemplated where each of display 116, keyboard 118, and mouse 120 are replaced with a touch screen of a mobile device.

Turning now to FIG. 1B, a system figure illustrating elements of a system 150 for carrying out embodiments of the invention is depicted. The system 150 comprises any number of client devices, such as client device 152, client device 154, and client device 156. As depicted in FIG. 1B, client devices 152, 154, and 156 may be any of a desktop computer, a laptop computer, a mobile phone, a tablet, or any other device suitable to allow a user to access the group-based communication system. The user may also switch from one client device to another and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system 150 further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communication system hosted on the same server as a competitor's group-based communication system for security reasons. Group-based communication system server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. In some embodiments, each user of the plurality of users may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels are present within the group-based communication system. Users may be added to each channel, such that users within one of the channels have access to messages and files posted within that channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively, or in addition, in any of these embodiments, data may be shared across multiple group-based communication system data stores.

It should be understood that any of the client devices 152, 154, and 156, and the group-based communication system server 158 may comprise a processor, such as CPU 106 described with respect to FIG. 1A. Any of the operations described herein with respect to a processor may be carried out by the processors within any of the devices described herein. For example, in some embodiments, a processor within the group-based communication system server 158 may perform a first operation, while a processor within the client device performs a second operation.

Figure 2A:
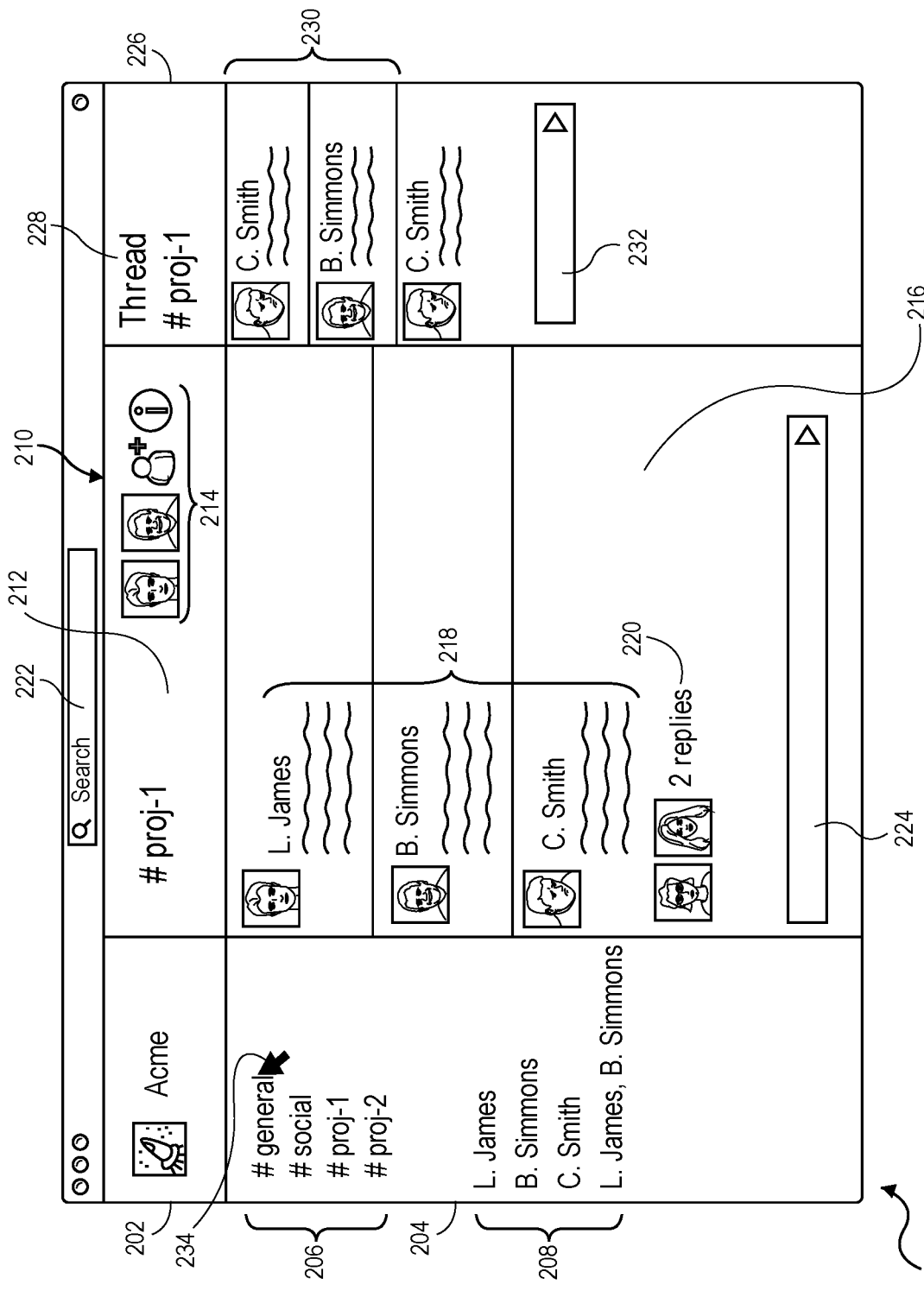
FIG. 2A depicts an exemplary embodiment of the user interface for the group-based communication system for carrying out embodiments of the invention.

Turning now to FIG. 2A, an embodiment of parent window 200 is depicted. Broadly speaking, parent window 200 comprises a plurality of panes. As depicted, parent window 200 comprises workspace pane 202; channel list pane 204, which comprises channel list 206 and direct message list 208; channel pane 210, which comprises channel header 212, channel controls 214, channel display 216, messages 218 and thread reply preview 220; search pane 222; compose pane 224; and thread pane 226 which comprises thread header 228, thread display 230 and thread compose pane 232. In some embodiments, users can interact with the panes to navigate and utilize the various functions available within the group-based communication system.

As depicted, parent window 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Development. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme software development projects, a workspace for Human Resources, and an additional workspace for general company matters. In some embodiments, workspaces can be associated with one or more organizations or other entities associated with the group-based communication system.

As depicted, parent window 200 further comprises channel pane 210 that comprises information related to the currently displayed channel. In some embodiments, within the group-based communication system, communication may be organized into "channels," each channel dedicated to a particular topic or set of users. Members of a particular channel can post messages within that channel that are visible to other members of that channel together with other messages in that channel. Users may select a channel for viewing in order to see only those messages relevant to the topic of that channel without seeing messages posted in other channels on different topics. Channel pane 210 may comprise channel header 212, channel controls 214, channel display 216, and compose pane 224. Channel display 216 may display all of the content transmitted via the channel including, but not limited to, messages 218 and thread reply previews 220. Users may navigate between channels using channel list pane 204. Channel list pane 204 may comprise a list of channels to which the user has subscribed to or to which the user has been granted access. Users can switch the currently displayed channel by selecting another channel in channel list pane 204.

In some embodiments, channel list pane 204 further includes direct message list 208. Direct message list 208 comprises a list of messages sent from a user directly to another user of the group-based communication system and may be displayed in channel pane 210 when selected. Direct messages may be sent to at least one other user. For example, the user may have a question for a manager, so the user may send a direct message to the manager asking the question. The manager may want to include another member of the group-based communication system in a response, so the manager may create a direct message group that includes the user and the other member of the group-based communication system. Direct messages may be sent to any number of users.

In some embodiments, conversations in channels may further be broken out into threads. Threads may be used to avoid cluttering a channel with conversation unrelated to the channel topic. For example, a user, C. Smith, in the channel #proj-1 may ask a question pertaining to a specific test that needs to be conducted. Another member of the channel may decide to reply to the user in a thread to keep the conversation grouped together and to keep the response from getting lost in the channel. Under the message to which a user has replied, appears thread reply preview 220. Thread reply preview 220 may show information related to the thread, such as, for example, the number of replies and the members who have replied. Thread replies may appear in thread pane 226 that may be separate from channel display 216 in channel pane 210 and may be viewed by other members of the channel by selecting thread reply preview 220 in channel display 216.

In some embodiments, thread pane 226 includes thread header 228 that may display the channel the thread is associated with. Thread pane 226 also may include thread display 230 that displays each message sent in the history of the thread. Users participating in the thread may also reply directly to the thread using thread compose pane 232. Thread compose pane 232 may be positioned within thread pane 226 where a user can compose and transmit a reply to the messages in the thread.

Channel pane 210 may also include channel header 212, which may display metadata for the currently selected channel, including channel name, channel membership, and channel topic. Channel header 212 may also display channel controls 214 for viewing members of the channel, inviting a new member to the channel, viewing information about the channel, or other channel-related functions.

As previously mentioned, channel pane 210 may also include compose pane 224. Compose pane 224 allows users to compose and transmit messages to the members of the channel. Compose pane 224 may have text editing functions such as bold, strikethrough, and italicize. Compose pane 224 may also allow users to format their messages or attach files such as, but not limited to, a Portable Document Format (PDF) to share the file with other members of the channel.

Parent window 200 may also include search pane 222. Search pane 222 may allow users to search for content located in the current workspace of the group-based communication system. For example, a user may be looking for a file that was sent in a channel previously. The user may not remember which channel the file was sent in or when the file was sent, so the user may search for the file name in search pane 222. Users are not limited to searching for only files and may also search for messages, channels, members, and the like.

Figure 2B:
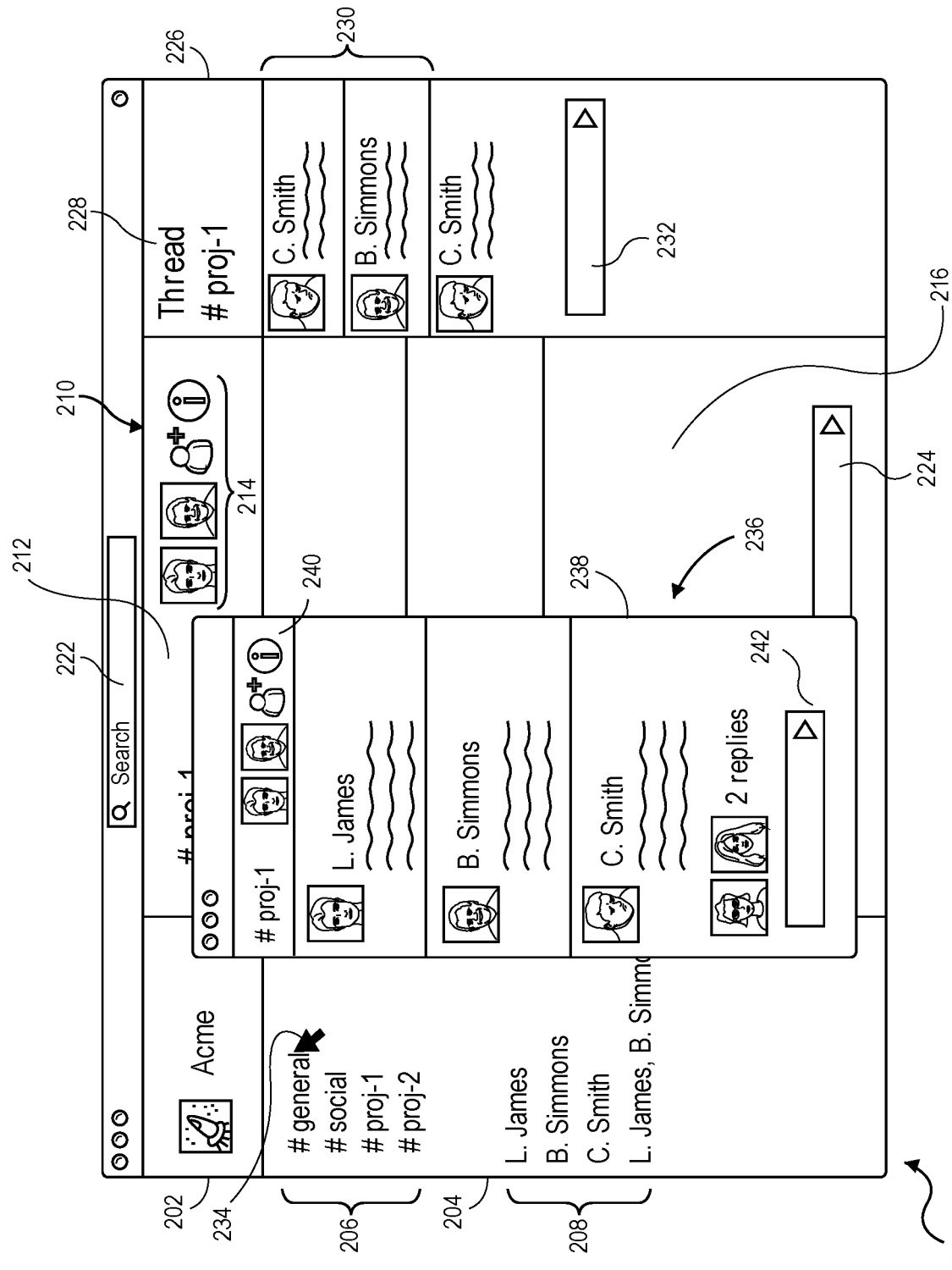
FIG. 2B depicts a child window overlaid on the parent window for some embodiments of the invention.

Turning now to FIG. 2B, an exemplary embodiment of child window 236 is overlaid over parent window 200. As shown, child window 236 comprises child channel pane 238, child channel header 240, and child compose pane 242. However, child window 236 is not limited to the aforementioned child panes and may include any child pane corresponding to a parent pane. For example, child window 236 may also include a child search pane corresponding to parent search pane 222. Alternatively, child window 236 may exclude child channel header 240. Child windows including any combination of child panes are considered herein. In some embodiments, child window 236 may be distinct from parent window 200 such that the location of child window 236 on display 116 is not tied to the location of parent window 200 on display 116 and may be moved independently from parent window 200.

In some embodiments, a child window is created when an actuation of a control is received on a pane of the plurality of parent panes making up parent window 200. Actuations may be one of several types. A first type of actuation (for example, a click of a left mouse button or a short tap on a touchscreen) may cause a change in a state of the group-based communication system in the parent pane. For example, left clicking on a channel in channel list pane 204 may cause channel pane 216 to be displayed in a new pane of the group-based communication system which includes the contents of the indicated channel. A second type of actuation (for example, clicking an affordance to pop out a child window from the parent window) may create a child window and is distinct from the first type of actuation. For example, clicking on an affordance to pop out a channel in channel list pane 204 may cause a new window to be created that shows the content of the indicated channel, without changing the state of channel pane 216 in parent window 200. Many different actuations are contemplated for the second type of actuation and are discussed in further detail below. The control may be a button or a link or the like on parent window 200. For example, the channel name "#proj-1" in channel list 206 may be the control. Additionally, or alternatively, the direct message name "B. Simmons" in direct message list 208 may be the control. In some embodiments, the control may be in any of the plurality of parent panes. Additionally, the control may be any object presented in any of the plurality of parent panes. When child panes are generated from child panes, the control may similarly be any object provided on the child pane.

In some embodiments, when the first type of actuation of the control is received, a parent pane the plurality of parent panes change state. In some embodiments, the first type of actuation is a left click on mouse 120 with pointer 234. Alternatively, the first type of actuation is a press or a tap on a touch screen. Other types of actuation are considered to be a first type of actuation, and the invention is not limited to the aforementioned first types of actuations.

The pane in which the user actuated the control may be considered the control parent pane, while the pane in which the change of state occurs may be considered the target parent pane. Both the control parent pane and the target parent pane may be any pane of the plurality of parent panes. As a non-limiting example, consider parent window 200 with channel display 216 currently displaying the channel #proj-1 as shown in FIG. 2A. A user, L. James, may want to view the direct message with coworker, B. Simmons, and left click on (i.e., a first type of actuation) the associated direct message in channel list pane 204, causing channel pane 210 to change state from displaying the #proj-1 channel to displaying the direct message conversation between the user and B. Simmons. Therefore, in this example, channel pane 210 is the target parent pane, and channel list pane 204 is the control parent pane. As mentioned above, the target parent pane is not limited to channel pane 210 and may be any of the plurality of parent panes comprising parent window 200.

In some embodiments, when the user inputs the second type of actuation of the control, a child window is created. Returning to the example of the Acme team, the user may be conducting a test and acquiring data. The data may be received and recorded via a data acquisition device which may be communicatively coupled to computer 102, updated in real-time as the data is being acquired, and presented to the user via a graphical user interface associated with the test. Further, the user may be running this test for the first time, and, therefore, may have questions regarding the test and may desire to communicate with team members via the channel #proj-1 while the test is being run to receive real-time assistance. To view the channel, the user may actuate the first type of control on the channel name in channel list pane 204. This actuation may cause the channel to display in channel display 216 as described above. However, the entirety of parent window 200 would still be present, taking up valuable screen space on display 116. To avoid this problem, the user may decide to open the channel in child window 236, to view alongside the graphical user interface associated with the test in order to monitor the results and communicate with team members simultaneously. To do so, the user inputs the second type of actuation of the control on the channel in channel list 206 disposed within channel list pane 204 which, in this exemplary scenario, causes the creation of child window 236.

Many types of actuations may be considered to be the second type of actuation. For example, the second type of actuation may be a right click on mouse 120 and a selection of a menu item with pointer 234. Additionally, or alternatively, the second type of actuation may be a tearing off of the target parent pane from parent window 200, causing the target parent pane to be removed from parent window 200. As an example, the user may click on a direct message in direct message list 208 and drag it off of parent window 200, thereby creating a child window. Alternatively, the user can click and drag within channel display 216 to cause the currently displayed channel to be removed from parent window 200 and display in its own child window. Following this tearing off, channel display 216 may change state to display the next channel or direct message in channel list 206 or direct message list 208. For example, if the user clicks and drags the channel #proj-1 from channel display 216, then the channel #proj-2 may now be displayed in channel display 216. Alternatively, channel display 216 may continue displaying the removed channel. Any new channel, direct message, or any other pane may be displayed in channel display 216 upon removal of channel #proj-1.

In some embodiments, the second type of actuation may also be a long press on a touch screen and a selection of a menu item. The long press actuation may be utilized when the user is using the group-based communication system on a device that has a touch screen such as a smartphone, a tablet, a laptop or the like. Other types of actuations such as a double tap on a touch screen are also considered, and the invention is not intended to be restricted to the aforementioned actuation types. Any actuation type may be used as either the first type of actuation or the second type of actuation.

As previously mentioned, after the second type of actuation is received, a child window for parent window 200 for the group-based communication system may be created. The child window may comprise one or more child panes, wherein the one or more child panes correspond to a subset of the plurality of parent panes. For example, the channel #proj-1 may be displayed in child window 236 created following the second type of actuation. Child window 236 may display a plurality of child panes such as child channel pane 238 which may display channel messages 218, child compose pane 242, allowing the user to send messages to team members via the child window, and child channel header 240. Child channel pane 238, therefore, in this example, corresponds to (e.g., displays the same or similar information) parent channel pane 210, while child compose pane 242 corresponds to parent compose pane 224.

In some embodiments, the control parent pane and the target parent pane are the same pane. For example, the user may actuate the first type of actuation of the control in search pane 222 of parent window 200. In response to receiving the actuation, search pane 222 may change state. Search pane 222 may change state and enlarge from its original size such that it takes up more space in parent window 200 and is easier to view. Additionally, or alternatively, search pane 222 may change state such that further search options that were not present in the original state of search pane 222 may be present and interactable by the user. For example, search pane 222 may now present options allowing the user to choose to limit the search to a certain file type or to limit the search to a particular channel or the like.

Similarly, the control parent pane and the target parent pane may also be the same pane when the second type of actuation is received. As another example, receiving the second type of actuation of the control on search pane 222 may cause a child window to be created and comprising a child search pane corresponding to parent search pane 222. The child search pane may have all the functionality of parent search pane 222 and may be viewable even when parent window 200 has been minimized or is not visible on display 116.

Figure 2C:
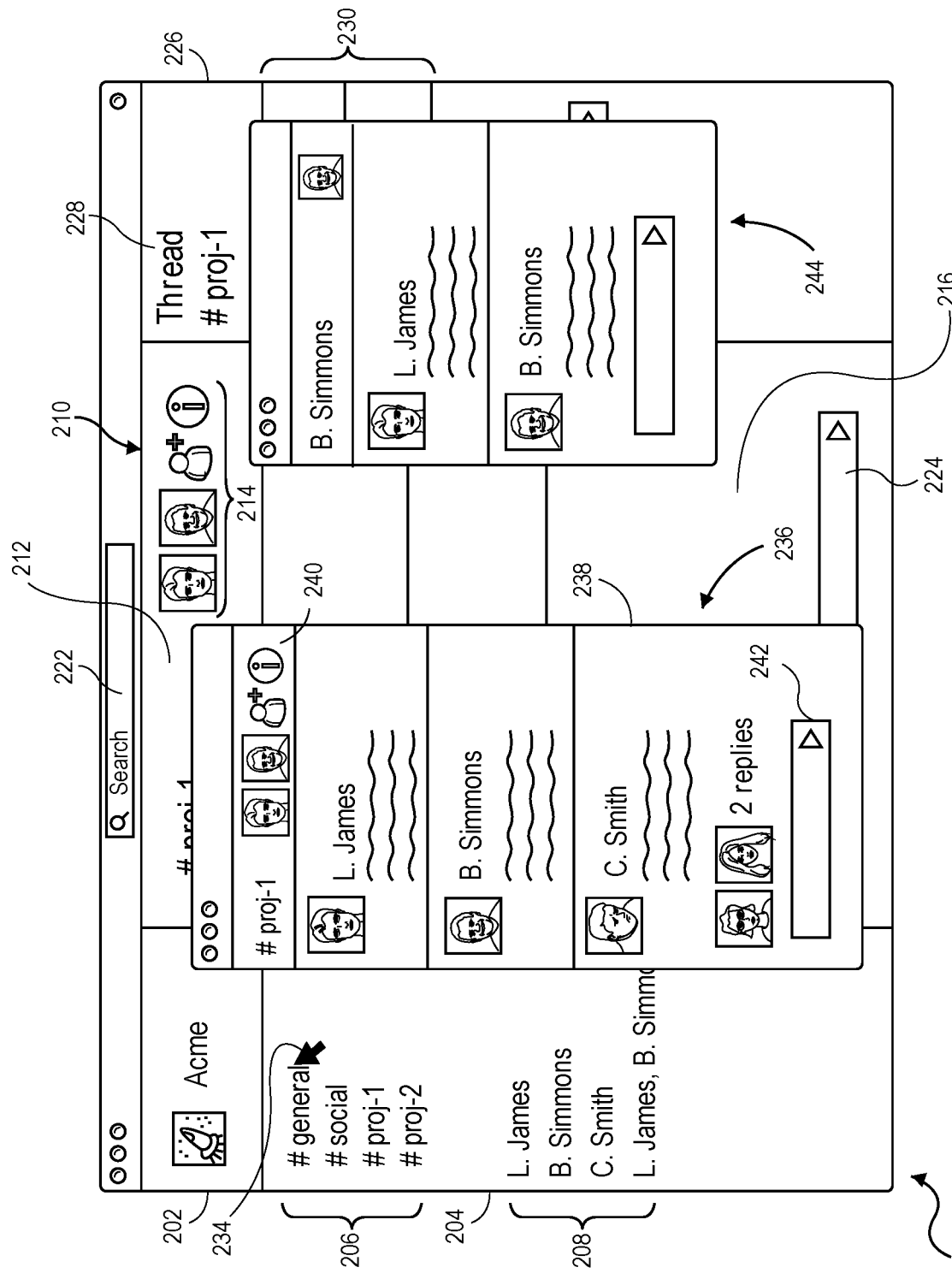
FIG. 2C depicts multiple child windows overlaid on the parent window for some embodiments of the invention.

FIG. 2C depicts an exemplary embodiment where multiple child windows that were created from parent window 200 are overlaid on parent window 200. Child window 236, discussed with respect to FIG. 2B above, is associated with the channel #proj-1, while alternate child window 244 is associated with a direct message between the user and another member, B. Simmons, of the workspace of the group-based communication system. FIG. 2C depicts how the child windows may be overlaid on top of parent window 200. However, in some embodiments, child windows are not tethered to the location of parent window 200 and may be repositioned anywhere on display 116. In some embodiments, the user may select a location on display 116 to lock the child windows in place. The location may be associated with the location of parent window 200.

In some embodiments, an input is received in a child window causing a change in state in both the child window and the parent window. Specifically, an input may be received in a child pane of a child window causing a change in a state of the child pane and a change in a state of a corresponding parent pane in the parent window. Consider, for example, the group-based communication system as shown in FIG. 2C where the parent window 200 is displayed along with the two overlaid child windows, child window 236 and alternate child window 244. Parent channel pane 210 of parent window 200 may display the #proj-1 channel, which is also displayed in child channel pane 238 in child window 236. The user may send a message via child compose pane 242 in child window 236. Sending the message may cause child channel pane 238 to change state and update, displaying the new message. Accordingly, the corresponding target parent pane (channel pane 210) also changes state and updates, presenting the new message sent via child window 236. In the event that child channel pane 238 and parent channel pane 210 display separate channels, the message sent by the user via child compose pane 242 updates in its respective channel such that when the user switches parent channel pane 210 to view the corresponding channel, the message sent may then be presented in channel display 216.

In some embodiments, the input into the child window may also cause a change of state in at least one other child pane. As an example, if two child windows are open, a first child window displaying a channel such as child window 236, and a second child window displaying a thread opened from child window 236, a message sent via the thread will cause a change of state in the second child window, first child window 236, and parent window 200, as each will update to display the message. Rather than redundantly updating the second child window with the change via a network communication with the group-based communication server, the second child window may automatically update because the first child window and the second child window share the same memory.

In some embodiments, multiple child windows may be opened from parent window 200 as depicted in FIG. 2C. Users may choose to open up any number of child windows using the processes described above. Returning to the example of the Acme employee performing the test, the employee may receive a direct message from the manager. In order to continue monitoring the test data, the employee may elect to open the direct message from the manager in a child window. The child window may also be distinct from parent window 200. Child windows are not limited to only direct messages or channels. As mentioned previously, embodiments of the invention are considered wherein child windows may be created from any of the plurality of parent panes.

In some embodiments, child windows can be created from other child windows. As an example, consider a case where the user has opened the channel #proj-1 in its own child window, such as child window 236. The user may want to view the thread replies that are associated with the message sent by user C. Smith in its own child window in order to participate in the thread conversation. As described above, the user may input the second type of actuation on the thread reply preview, thus creating a child thread window 242. The resulting child thread window 242 may comprise a plurality of child panes as well. In this non-limiting example, child window 236 may become the parent window of the child thread window 242. Consequently, in some embodiments, an actuation causes a change in a state of multiple target parent panes. For example, if a user sends a message via the child thread window, a change of state may take place in both the child channel pane (which is the parent of the child thread window) and the parent channel pane, displaying the sent message.

In some embodiments, switching channels or direct messages can be performed within a single child window. As an example, the user may want to only have a single child window open such that the user can better focus on work in an application distinct from the group-based communication system. However, the user may also like to be able to monitor two conversations at a time such as the channel #proj-1 and the direct message conversation with B. Simmons. In this embodiment, the user can switch panes via the first type of actuation. This first type of actuation may take the exemplary form of a left click on mouse 120 and a selection of an item in a menu. As described in additional detail below, child and parent windows may be resized, moved, and minimized independently. For example, the child window may be visible while the parent window is minimized. Additionally, in some embodiments, child and parent windows may be closed independently, such that a parent window may be closed while any children remain open. Alternatively, in other embodiments, closing a parent window will close any open child windows.

Figure 3:
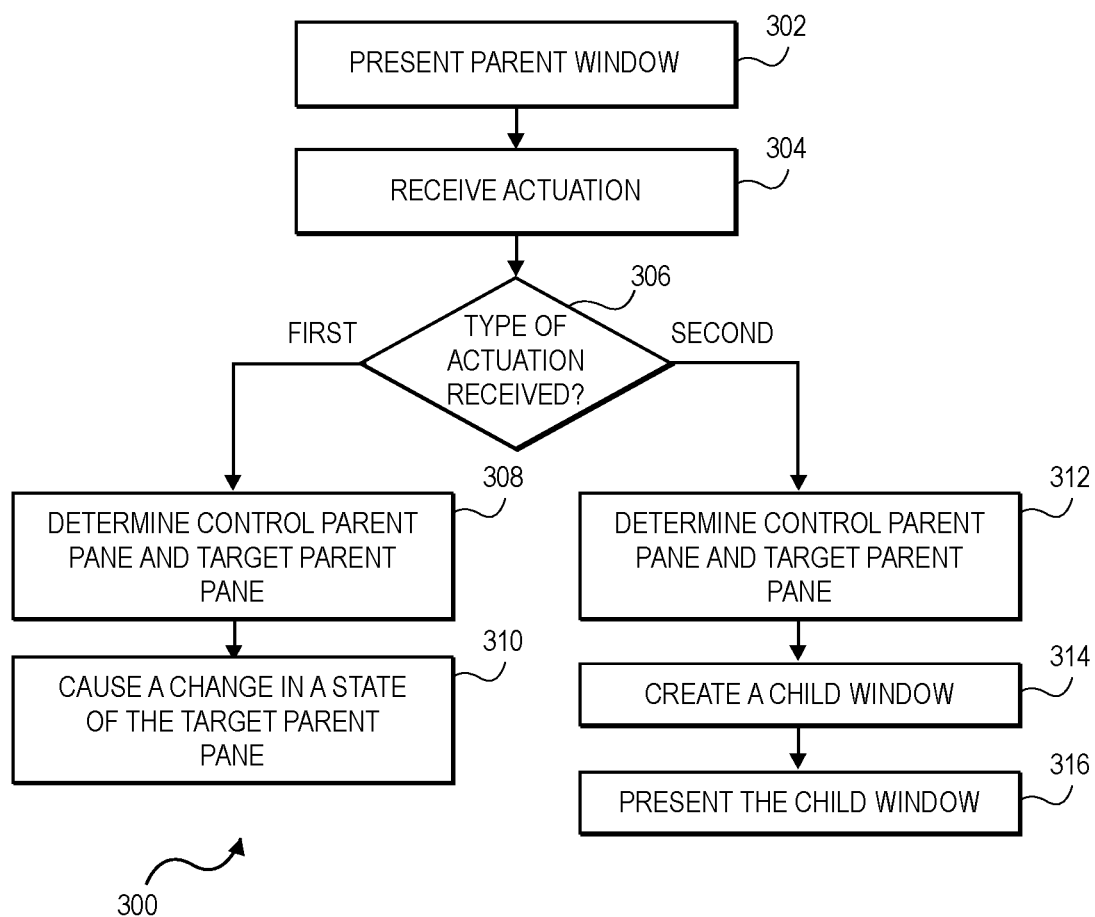
FIG. 3 depicts a method for creating child windows for some embodiments of the invention.

Turning now to FIG. 3, a flowchart illustrating the operation of a method in accordance with embodiments of the invention is depicted and referred to generally by reference numeral 300. Initially, at step 302, a parent window may be presented. The parent window comprises a plurality of panes, making up the user interface for the group-based communication system. As mentioned above, the plurality of panes may be any of workspace pane 202, channel list pane 204, channel pane 210, search pane 222, compose pane 224, and thread pane 226, or any other pane used in the group-based communication system.

Next, at step 304, the group-based communication system receives an actuation of a control in a pane of the plurality of panes of parent window 200 from a user. Actuations may be one of a first type of actuation or a second type of actuation as described above. The pane of the plurality of parent panes on which the control is actuated is the control parent pane. The actuation of the control may cause a change in a state in a target parent pane of the plurality of parent panes. As mentioned previously, the control parent pane and the target parent pane may be the same pane. Additionally, in the case where a new child window is opened from an already present child window, the already present child window may have control panes and target panes. Accordingly, the already present child window is the parent of the new child window.

At decision 306, the type of actuation received is determined. If the first type of actuation is received, the process moves to step 308 where the control parent pane and the target parent pane are determined based on the pane in which the control was actuated and the pane in which the change of state occurs. As mentioned previously, the control parent pane and the target parent pane may be the same pane or may be any pane of the plurality of parent panes.

The process then moves to a step 310 where a change of state in the target parent pane occurs. As mentioned previously, this change of state can take many forms. For example, the channel pane may change state to display a different channel. Additionally, or alternatively, in response to the first type of actuation occurring on a control in workspace pane 202, multiple panes may change state. As a non-limiting example, the first type of actuation in workspace pane 202 may cause the group-based communication system to change from one workspace to another. For instance, the Acme user may change from viewing the Acme workspace to viewing the volunteer organization workspace. Therefore, multiple panes may undergo a change of state as channel list pane 204, channel pane 210, and thread pane 226 may all change to display information related to the volunteer organization workspace. After the change in state has occurred, the process then moves back to the beginning of the process to step 302, and presents parent window 200.

If, at decision 306, it is determined that the actuation received is the second type of actuation, the process moves instead to step 312 where the control parent pane and the target parent pane are determined as described above with respect to step 308. The process next moves to step 314, where a child window is created for the group-based communication system. The child window comprises one or more child panes including a target child pane corresponding to the target parent pane and reflecting the change in the state of the target pane. As an example, if a second type of actuation is received on the #proj-2 channel in channel list pane 204, thus making parent channel pane 210 the target parent pane, a child window may be created including a target child channel pane for the #proj-2 channel corresponding to the target parent channel pane.

Further still, the one or more child panes may exclude at least one pane of the plurality of parent panes. Continuing with the previous example, the child window created by the second type of actuation may exclude channel list pane 204 in which the control was actuated upon. This exclusion may help to minimize the extraneous information the user is seeking to eliminate by the creation of the child window.

In some embodiments, users can configure the child windows such that they open with child panes pre-selected by the user. For instance, when opening any direct message conversation, the user may desire to display only a child compose pane and a child channel pane. Additionally, or alternatively, the user may desire to also include a child search pane in the created child window. The user may also configure child channel panes in child windows based on the parent pane associated with the child window. For example, users may desire to have a different set of child panes displaying when a child window is created from a channel than when a child window is created from a direct message.

In some embodiments, users can configure the group-based communication system to open specified child windows upon launch. Therefore, users can customize the group-based communication system to avoid having to re-open specific child windows each time the application is opened. For instance, if the user works closely with and is often communicating with team member, B. Simmons, the user may wish to have the direct message opened when the group-based communication system is launched.

Next, at step 316, the child window is presented to the user. When presented, the child window is distinct from parent window 200. The child window may be distinct in such a way that the child window may be moved separately from parent window 200 and may be displayed when parent window 200 is minimized. Further, in some embodiments the child window may still be operational when parent window 200 of the group-based communication system has been closed by the user if, for example, the group-based communication application is still running in the background of computer 102. Alternatively, in some embodiments closing parent window 200 causes all child windows to close as well. In this case, when the group-based communication system is re-opened, the closed child windows may automatically be created and displayed to the user. In other embodiments, child windows that are closed by closing parent window 200 are not re-opened when the group-based communication system is re-launched. The process may now be repeated any number of times to create any number of child windows or to receive the first type of actuation to change the state of a target parent pane. For instances in which a child window is created from another child window, the above-described process may still be utilized. In such a case, the child window in which the control is actuated is then considered to be the parent window and the process continues as outlined above.

Figure 4:
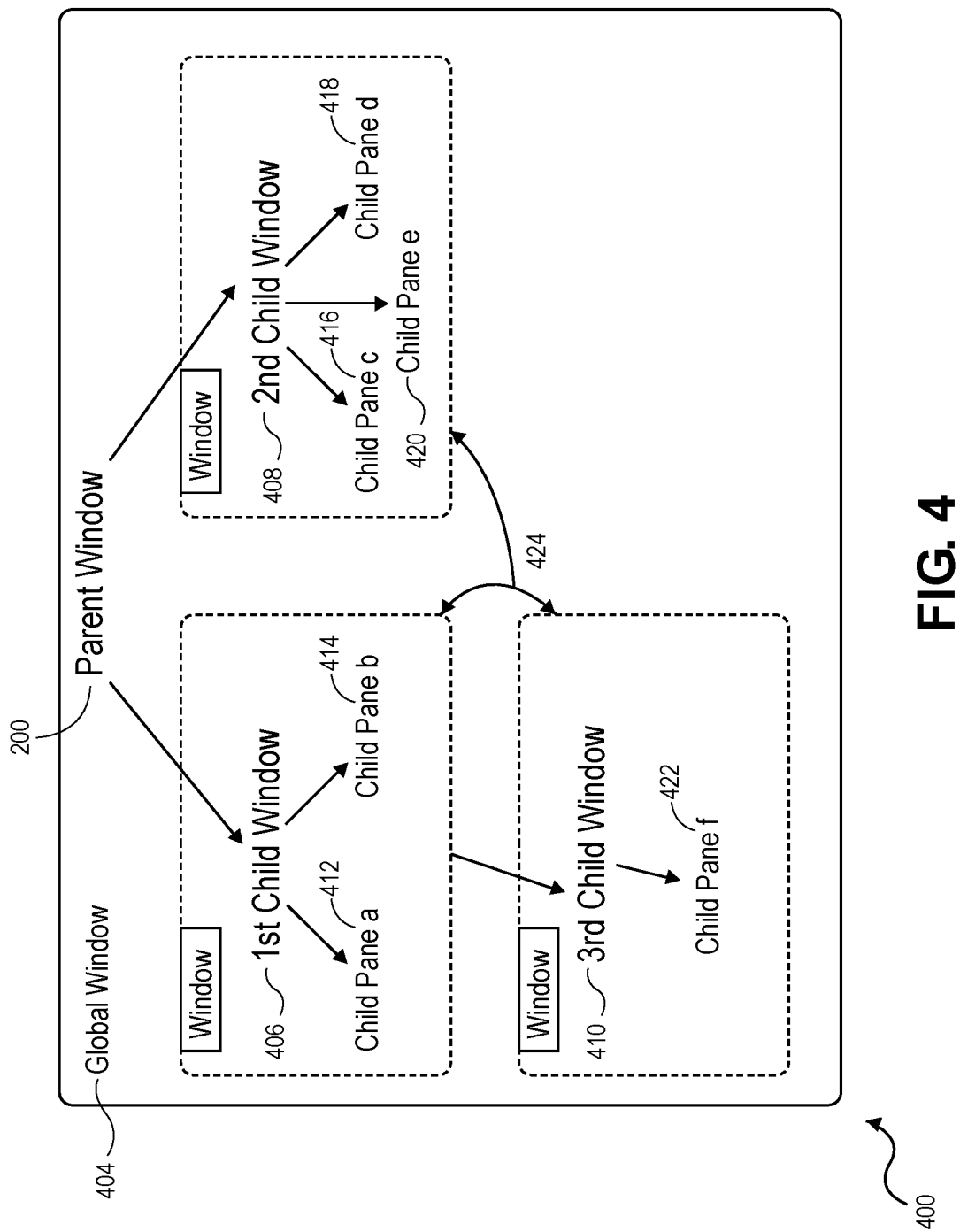
FIG. 4 depicts a hierarchical tree for the relationship between the parent window and the child windows for some embodiments of the invention.

FIG. 4 depicts an exemplary embodiment of a hierarchical tree depicting the dependency of child windows upon the parent window generally referenced by numeral 400. The relationship of global variables to the child windows when a wrapper function is employed is also depicted. Parent window 200 is at the top of hierarchical tree 400, also referred to as the root of the tree. Parent window 200 comprises two directly dependent child windows, first child window 406 and second child window 408. In this example, third child window 410 was created from first child window 406. Third child window 410 may be a child thread pane as described above. Each child window includes a subset of associated child panes such as child pane a 412, child pane b 414, child pane c 416, child pane d 418, child pane e 420, and child pane f 422. The child panes may be any of the aforementioned panes such as, for example, channel pane 210 or compose pane 224. Additionally, the child panes need not be distinct for each child window. That is, child pane a 412 and child pane c 416 may both be presented by various child channel panes.

Global variable window 404, seen in the top left corner, is depicted as an exemplary global variable. Embodiments of the invention are not limited to just a single global variable and there may be multiple global variables utilized in embodiments. Each child window is surrounded with shadow variable context 424, depicted as a dashed line. For example, shadow variable context 424 may be implemented as a wrapper function around a main thread function for the respective pane when that pane is instantiated as a separate window. Within shadow variable context 424, the global variable window is shadowed by a new local variable window, such that the new local variable can only be referenced within the scope of that specific function. As an example, user interfaces for group-based communication systems may be run using code that employs global variable window 404 for certain programming libraries such as JavaScript. Window 404 is used to manipulate the user interface and may have methods such as .open( ) and .close( ) Within the global context, window will always refer to parent window 200, as it was designed for only single window contexts. For example, absent variable shadowing as disclosed herein, if the group-based communication system attempted to open a page in a child window by calling the window.open( ) method in the child window context, the page would open in parent window 200 as window 404 assumes parent window 200 is the only window present. However, when window 404 is shadowed (and re-initialized) within shadow variable context 424, methods within the scope of the shadow variable context using window 404 will not refer to parent window 200 and instead will refer to the child window. Therefore, the scope within shadow variable context 424 can be limited to the specific child window, thus allowing global variables such as window 404 to be used, thus alleviating the problems arising from utilizing libraries that were designed with only a single window in mind.

Further, as depicted in FIG. 4, each child window descends from parent window 200, such that each child window shares a single memory space with parent window 200. Because the parent window 200 and each child window created therefrom share a single memory, any need to open separate communication connections for each child window is avoided. In an embodiment, the communication connection is a Websocket Protocol connection based on the Websocket Protocol standard as set forth in Internet Engineering Task Force ("IETF") Request for Comments ("RFC 6455"). Child windows sharing memory space and communication connections with the parent window avoids memory issues, such as boot and fetch time, that can occur if each child window was opened as its own instance of the group-based communication system application. If, for example, child windows 406, 408, and 410 were opened as separate new instances of parent window 200, then computer 102 would have to use three times the amount of memory to run the group-based communication system with parent window 200 and child windows 406, 408, 410 opened. Therefore, child windows that share a memory space and communication connections with parent window 200 leads to an improved performance in the user interface for the group-based communication system.

```
global window = Window.new(..);
open(Parent.MainPane);
function f (...) {
    // logic for function f( )
}
function wrapCall(targetwindow, args) {
    //auto-generated function
    var window = targetwindow;
    // logic for function f( )
}
function openInChild(target, contents) {
    wrapCall(target, open, contents);
```

```
                }
        function createChild(contents) {
                var childwindow = Window.new (...) ;
                openInChild(childwindow, contents);
                ...
        }
```

Pseudocode for implementing shadow variable context 424 for some embodiments is depicted above. Such techniques are particularly applicable for libraries designed to operate only in a single-window context to allow them to be used in a multi-window context as well. Beginning with the first and second lines, two windows are created, one of which is assigned to the well-known global variable window 404 and the other of which is stored in a shadow variable window 406. Next, a function f( ) is provided that implements changes to a window. Then, a function wrapall( ) is provided (and may be, in some embodiments, automatically generated based on the wrapCall( ) function described below) for providing a shadow variable context for an arbitrary function call, and this function is used to implement an openInChild( ) function. In some embodiments, wrapCall( ) in-lines the logic of the function f( ) after the declaration of shadow variable window 406, thereby shadowing the global variable window 404. Specifically, after defining global variable window 404 within wrapCall( ) the function has an identical definition as the function f( ) Finally, pages representing a main pane and a target pane are opened in the main window and the child window respectively. Where the open( ) method is used to open a page, the variable window is looked up to determine the context where the page is to be opened.

Under normal circumstances, looking up the variable window will return the global variable window 404 in the window as depicted. For example, when the group-based communication system is launched the open( ) method may be invoked to open a main page within the system, and this method invocation will use the global variable window 404. Similarly, when a user invokes a command to open a child page in a new window, the open( ) method will be called, and this would normally cause the global variable window 404 to be located and the child page to be opened in the main window rather than the desired child window, because, as previously mentioned, having been designed with only a single window in mind, it may initially assume the application window to act on is parent window 200. Therefore, as described above, shadow variable context 424 is created within wrapCall( ) The function wrapCall( ) takes a local variable storing a window and may inline the logic of the function f( ) to invoke on that window. By declaring a new (local) shadow variable window 406 and initializing it to the window that was passed in, any time the variable window is looked up inside the scope of wrapCall( ) the shadow variable window 406 will be located rather than global variable window 404. The variable window now has two different definitions: one for the outer scope and another for the inner scope inside wrapCall( ).

Moving to the next function, openInChild( ) is depicted. This function, when used in place of the conventional open( ) function, allows an arbitrary window to be specified where the contents are to be opened, thereby removing the assumption in the API that only a single window is present that can be implicitly identified using the global variable window 404. Other, similar functions can be similarly defined to replicate the functionality of any function provided by the API that makes similar assumptions while allowing for an arbitrary window to be specified.

Moving to the final function, createChilldWindow( ) is depicted. In embodiments of the invention, this function may be called whenever the second type of actuation is received to create the child window. The function createChildWindow( ) first creates the new child window, then calls openInChild( ) using the returned window identifier. As described above, openInChild( ) in turn calls wrapCall( ) thereby shadowing the global variable window 406 with the newly created shadow variable window 406 as seen in FIG. 4. Therefore, when a method referring to window is called, window refers to the child window, allowing child windows to be created and rendered from parent window 200 when using libraries that assume single window applications. Further function calls inside the createChilldWindow( ) (such as, for example, attaching network sockets or event listeners) can be made using other wrapped functions similarly implemented using wrapCall( ).

The above-described method allows for modifying code to create child windows when the original code assumes a single window state. For example, code may be used from a third-party vendor that assumes a single window state. By adding the wrapper function, the third-party code will function as if it was designed for multiple windows without the need to actually use libraries designed for multiple windows.

In some embodiments, code may be modified to dispatch actions while automatically including the source window context, as depicted in the below pseudocode, thereby allowing the same code to work in a single-window and multi-window context.

```
var action = createAction( (dispatch, args, window) {
        dispatch(differentAction(args) ) ;
})
var differentAction = createAction( (dispatch, args, window)  {
        Window.open (...) ;
})
```

The above method allows for an action dispatcher to automatically include window context. Beginning with the first line, the variable action is initialized to a function createAction( ) which uses dispatch to dispatch a different action, differentAction. By using dispatch, the window argument in the createAction( ) function is automatically passed along to the dispatch function, differentAction. Therefore, it is not necessary to pass the target window down through multiple subsequent functions, allowing for single window code to share an event handler for actions in both parent and child windows without having to create duplicate copies of each function for each event.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of creating multiple windows in a user interface for a group-based communication system operating in a single-window user interface state, the method comprising:

causing display of a parent window of the user interface for the group-based communication system, wherein the user interface for the group-based communication system is implemented with one or more code libraries configured to operate in the single-window user interface state;

receiving, within the user interface, actuation of a control for creating a child window for the user interface;

responsive to receiving the actuation of the control, creating the child window for the user interface, wherein a local variable for the child window is associated with a global variable of the one or more code libraries that is configured to manipulate the user interface, the local variable comprising a local variable scope distinct from a global variable scope of the global variable; and responsive to a change of state in the parent window, reflecting the change of state in the child window.

2. The method of claim 1, the parent window comprising a plurality of parent panes, and the child window comprising at least one child pane corresponding to at least one parent pane in the parent window.

3. The method of claim 2,
wherein the control is a parent pane of the plurality of parent panes, and
wherein the actuation is a tearing off of the parent pane from the plurality of parent panes.

4. The method of claim 3, further comprising:
responsive to the tearing off of the parent pane, removing the parent pane from the parent window.

5. The method of claim 1,
the actuation of the control being received within a parent channel pane of the parent window displaying a first channel of the group-based communication system,
wherein the child window comprises a child channel pane corresponding to the parent channel pane, and
wherein the method further comprises:
responsive to creating the child window, updating the display of the parent channel pane to display a second channel that is distinct from the first channel.

6. The method of claim 1, wherein the child window is created with at least one preselected child pane, the at least one preselected child pane preselected by a user for display upon creation of the child window.

7. The method of claim 1,
wherein the child window is a first child window, and the actuation is a first actuation, and
wherein the method further comprises:
responsive to receiving a second actuation of the control for creating a second child window, creating the second child window for the user interface; and
responsive to a second change of state in the second child window, reflecting the second change of state in the first child window and in the parent window.

8. One or more non-transitory computer-readable media storing computer-executable instructions that, when executed by at least one processor, perform a method of creating multiple windows in a user interface for a group-based communication system operating in a single-window user interface state, the method comprising:
causing display of a parent window of the user interface for the group-based communication system,
wherein the user interface for the group-based communication system is implemented with one or more code libraries configured to operate in the single-window user interface state;
receiving, within the user interface, actuation of a control for creating a child window for the user interface;
responsive to receiving the actuation of the control, creating the child window for the user interface,
wherein a local variable for the child window is associated with a global variable of the one or more code libraries that is configured to manipulate the user interface, the local variable comprising a local variable scope distinct from a global variable scope of the global variable; and
responsive to a change of state in the parent window, reflecting the change of state in the child window.

9. The media of claim 8, the parent window comprising a plurality of parent panes, and the child window comprising at least one child pane corresponding to at least one parent pane in the parent window.

10. The media of claim 9,
wherein the control is a parent pane of the plurality of parent panes, and
wherein the actuation is a tearing off of the parent pane from the plurality of parent panes.

11. The media of claim 10, further comprising:
responsive to the tearing off of the parent pane, removing the parent pane from the parent window.

12. The media of claim 8,
the actuation of the control being received within a parent channel pane of the parent window displaying a first channel of the group-based communication system,
wherein the child window comprises a child channel pane corresponding to the parent channel pane, and
wherein the method further comprises:
responsive to creating the child window, updating the display of the parent channel pane to display a second channel that is distinct from the first channel.

13. The media of claim 8, wherein the child window is created with at least one preselected child pane, the at least one preselected child pane preselected by a user for display upon creation of the child window.

14. The media of claim 8,
wherein the child window is a first child window, and the actuation is a first actuation, and
wherein the method further comprises:
responsive to receiving a second actuation of the control for creating a second child window, creating the second child window for the user interface; and
responsive to a second change of state in the second child window, reflecting the second change of state in the first child window and in the parent window.

15. A system for creating multiple windows in a user interface for a group-based communication system operating in a single-window user interface state, the system comprising:
a database;
at least one processor; and
one or more non-transitory computer-readable media storing computer-executable instructions that, when executed by the at least one processor, cause the system to carry out actions, comprising:
causing display of a parent window of the user interface for the group-based communication system,
wherein the user interface for the group-based communication system is implemented with one or more code libraries configured to operate in the single-window user interface state;
receiving, within the user interface, actuation of a control for creating a child window for the user interface;
responsive to receiving the actuation of the control, creating the child window for the user interface, wherein a local variable for the child window is associated with a global variable of the one or more code libraries that is configured to manipulate the user interface, the local variable comprising a local variable scope distinct from a global variable scope of the global variable; and responsive to a change of state in the parent window, reflecting the change of state in the child window.

16. The system of claim 15, the parent window comprising a plurality of parent panes, and the child window comprising at least one child pane corresponding to at least one parent pane in the parent window.

17. The system of claim 16,
wherein the control is a parent pane of the plurality of parent panes,
wherein the actuation is a tearing off of the parent pane from the plurality of parent panes, and
wherein the actions further comprise responsive to the tearing off of the parent pane, removing the parent pane from the parent window.

18. The system of claim 15,
the actuation of the control being received within a parent channel pane of the parent window displaying a first channel of the group-based communication system,
wherein the child window comprises a child channel pane corresponding to the parent channel pane, and
wherein the actions further comprise:
responsive to creating the child window, updating the display of the parent channel pane to display a second channel that is distinct from the first channel.

19. The system of claim 15, wherein the child window is created with at least one preselected child pane, the at least one preselected child pane preselected by a user for display upon creation of the child window.

20. The system of claim 15,
wherein the child window is a first child window, and the actuation is a first actuation, and
wherein the actions further comprise:
responsive to receiving a second actuation of the control for creating a second child window, creating the second child window for the user interface; and
responsive to a second change of state in the second child window, reflecting the second change of state in the first child window and in the parent window.

* * * * *